United States Patent
Fuesting et al.

(10) Patent No.: US 11,298,768 B2
(45) Date of Patent: Apr. 12, 2022

(54) METHOD OF PREPARING A SURFACE FOR DIFFUSION BONDING AND METHOD OF DIFFUSION BONDING

(71) Applicant: Rolls-Royce Corporation, Indianapolis, IN (US)

(72) Inventors: Timothy Fuesting, Thorntown, IN (US); Joseph P. Henderkott, Westfield, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 166 days.

(21) Appl. No.: 16/684,974

(22) Filed: Nov. 15, 2019

(65) Prior Publication Data

US 2021/0146463 A1     May 20, 2021

(51) Int. Cl.
| | |
|---|---|
| *B23K 1/00* | (2006.01) |
| *B23K 1/20* | (2006.01) |
| *B22F 7/08* | (2006.01) |
| *B23K 101/00* | (2006.01) |
| *B23K 103/14* | (2006.01) |

(52) U.S. Cl.
CPC .................. *B23K 1/20* (2013.01); *B22F 7/08* (2013.01); *B23K 1/0018* (2013.01); *B23K 2101/001* (2018.08); *B23K 2103/14* (2018.08)

(58) Field of Classification Search
CPC .. B23K 2101/001; B23K 1/0018; B23K 1/20; B23K 2103/26; B23K 1/19; B23K 20/026
See application file for complete search history.

(56) References Cited

U.S. PATENT DOCUMENTS

| | | |
|---|---|---|
| 4,475,959 A | 10/1984 | Liang et al. |
| 5,976,337 A | 11/1999 | Korinko et al. |
| 6,331,217 B1 | 12/2001 | Burke |
| (Continued) | | |

FOREIGN PATENT DOCUMENTS

| | | |
|---|---|---|
| EP | 0 049 489 A1 | 4/1982 |
| EP | 1 987 903 A2 | 11/2008 |
| (Continued) | | |

OTHER PUBLICATIONS

European Search Report from corresponding international application No. EP 20 20 6083, dated May 10, 2021, 8 pp.

(Continued)

*Primary Examiner* — Erin B Saad
(74) *Attorney, Agent, or Firm* — Crowell & Moring LLP

(57) ABSTRACT

A method of preparing a surface for diffusion bonding comprises contacting a binder material with a discontinuous surface comprising surface regions separated by gaps. The binder material is selectively deposited onto the surface regions and has a sufficient viscosity to form a self-supporting layer without flowing into the gaps. The self-supporting layer of binder material comprises a mass density in a range from about 0.001 g/in$^2$ to about 0.050 g/in$^2$. A braze powder is distributed over the self-supporting layer of binder material, and a predetermined amount of the braze powder is attached to the binder material. The discontinuous surface is then heated to remove the binder material and adhere the braze powder to the discontinuous surface. Thus, a prewet surface with a braze deposit thereon is formed.

19 Claims, 4 Drawing Sheets

(56) References Cited

U.S. PATENT DOCUMENTS

| | | | |
|---|---|---|---|
| 2001/0001042 A1 | 5/2001 | Sinatra et al. | |
| 2001/0013390 A1* | 8/2001 | Staubwasser | F01N 3/281 |
| | | | 156/205 |
| 2004/0169063 A1 | 9/2004 | Stueber et al. | |
| 2008/0199718 A1 | 8/2008 | Sjodin et al. | |
| 2012/0000967 A1* | 1/2012 | Bischof | F01D 5/30 |
| | | | 228/256 |
| 2013/0343789 A1* | 12/2013 | Motoda | G03G 15/0806 |
| | | | 399/286 |
| 2015/0125281 A1* | 5/2015 | Georgieva | B23K 35/36 |
| | | | 415/200 |
| 2015/0125334 A1 | 5/2015 | Uetani et al. | |
| 2015/0184514 A1* | 7/2015 | Schmitt | B23P 6/007 |
| | | | 29/888.011 |
| 2017/0008084 A1 | 1/2017 | Witney et al. | |
| 2017/0246698 A1 | 8/2017 | Bruck | |
| 2018/0080336 A1 | 3/2018 | Lin | |
| 2018/0230584 A1 | 8/2018 | Lin et al. | |

FOREIGN PATENT DOCUMENTS

| | | |
|---|---|---|
| EP | 3 049 627 A1 | 8/2016 |
| GB | 2 051 624 A | 1/1981 |
| JP | 2019072772 A * | 5/2019 |
| WO | WO 2015/047698 A1 | 4/2015 |

OTHER PUBLICATIONS

B.R. Garrett, G.F. Blank, and A.J. Ranadive, "Broad Applications of Diffusion Bonding," *NASA Contractor Report* (*NASA CR-409*), National Aeronautics and Space Administration, Washington, DC, pp. 1-176, Mar. 1966.

\* cited by examiner

METHOD OF PREPARING A SURFACE FOR DIFFUSION BONDING AND METHOD OF DIFFUSION BONDING

TECHNICAL FIELD

The present disclosure relates generally to diffusion bonding, and more particularly to a method of preparing a surface for diffusion bonding.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. In a conventional turbine compressor, turbine blades may be fabricated separately from the rotor disk and then mechanically assembled such the turbine blades extend from machined slots on the disk; however, this configuration has the disadvantage of discontinuities between the blades and the disk. To eliminate such discontinuities, diffusion bonding techniques have been developed to bond the turbine blades to the disk to form a mechanically robust, monolithic component (a "turbine blisk"). Diffusion bonding is a solid-state bonding method, where elevated temperatures and typically high pressures are employed to obtain diffusion of atoms between mating components, allowing for formation of a thermally-stable metallurgical bond. Various gas turbine engine components may benefit from diffusion bonding. A partial list of these components includes compressor and turbine airfoils, compressor and turbine blisks, combustors, heat shields, structures, cases and others.

Diffusion bonding may be facilitated or improved by utilizing diffusion agents (elemental or ionic) or braze materials, such as braze foils or powders, between the components to be joined. However, the bonding of components having complex surface geometries can present challenges with the use of such diffusion agents. For example, the use of braze foils may not be effective for irregular or discontinuous surfaces, and it may be difficult if not impossible to deposit consistent levels of braze powder on such surfaces using methods known in the art. In addition, traditionally-used binders for the braze powder may lead to contamination of the bonded joint. Other methods of depositing elemental or ionic materials can lead to unwanted modifications of adjacent surfaces impacting the material properties in these areas.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

Figure 1A:
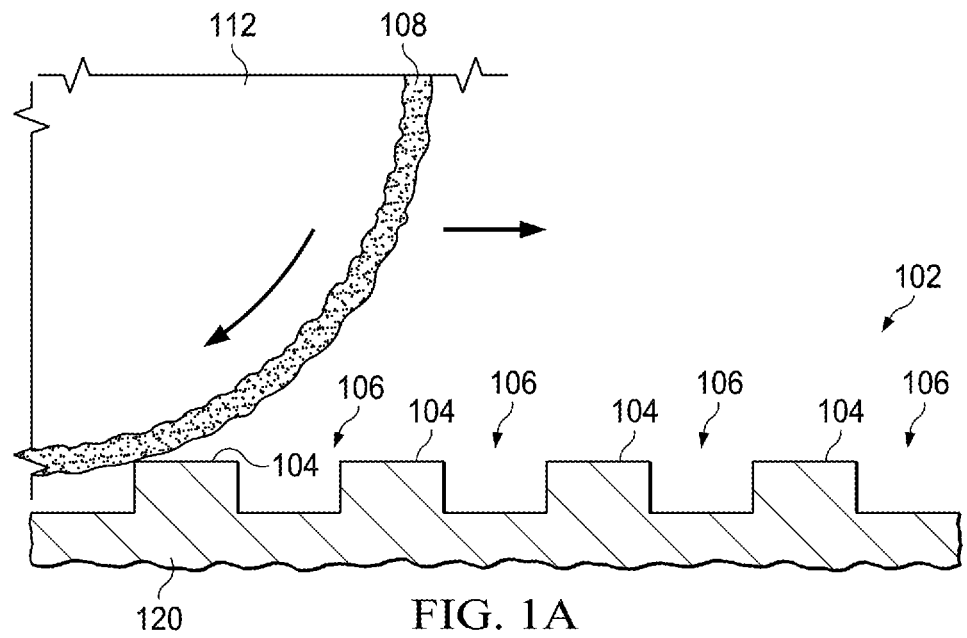
FIGS. 1A-1D are cross-sectional schematics illustrating a method of preparing a surface for diffusion bonding.
Figure 1B:
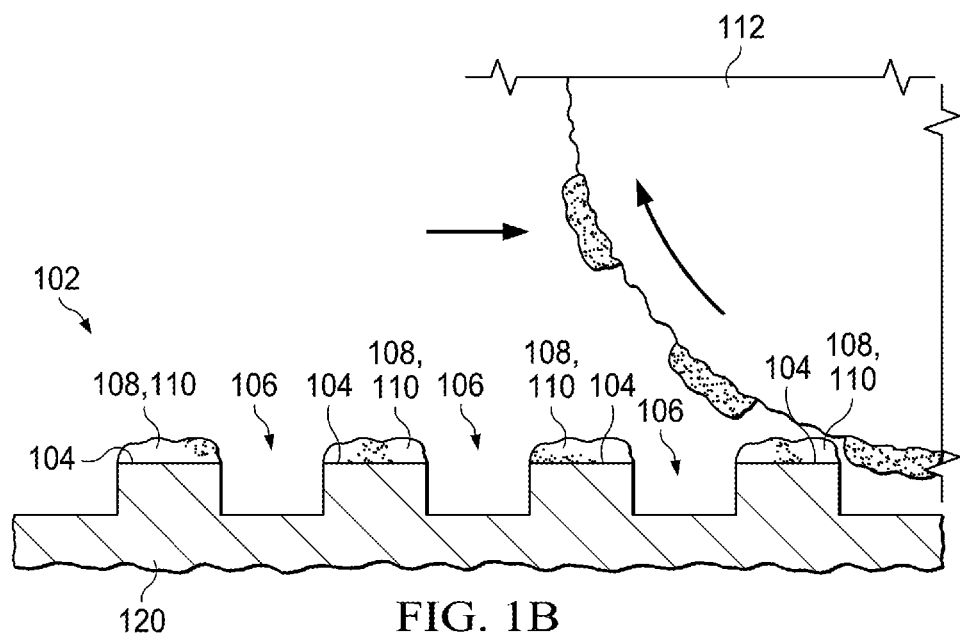
Figure 1C:
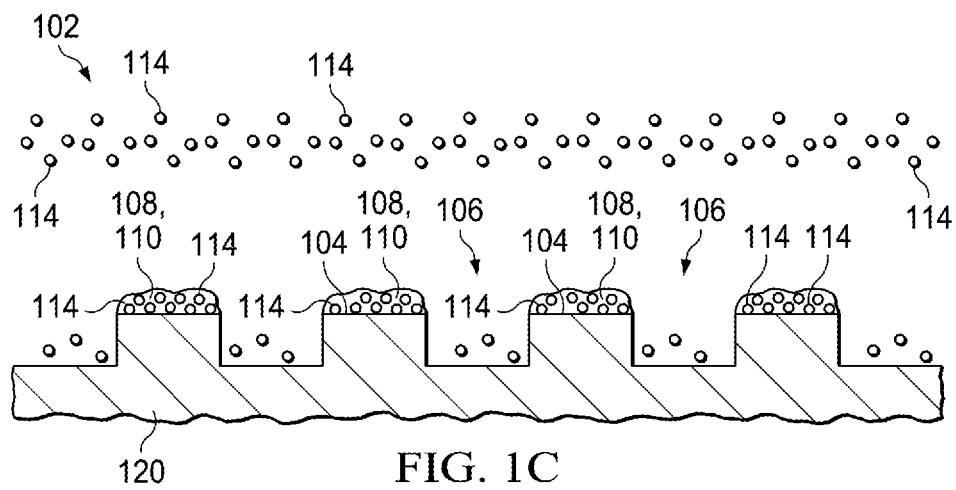
Figure 1D:
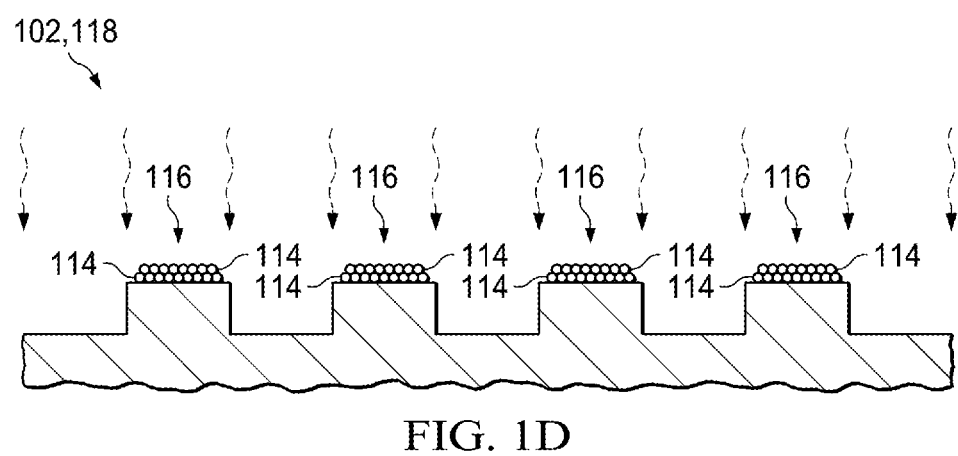
Figure 1E:
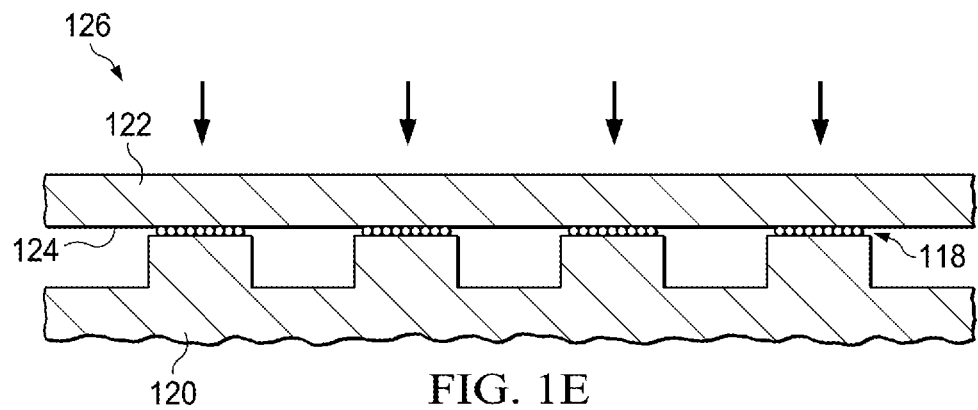
FIGS. 1E and 1F illustrate diffusion bonding of the surface to a mating surface.
Figure 1F:
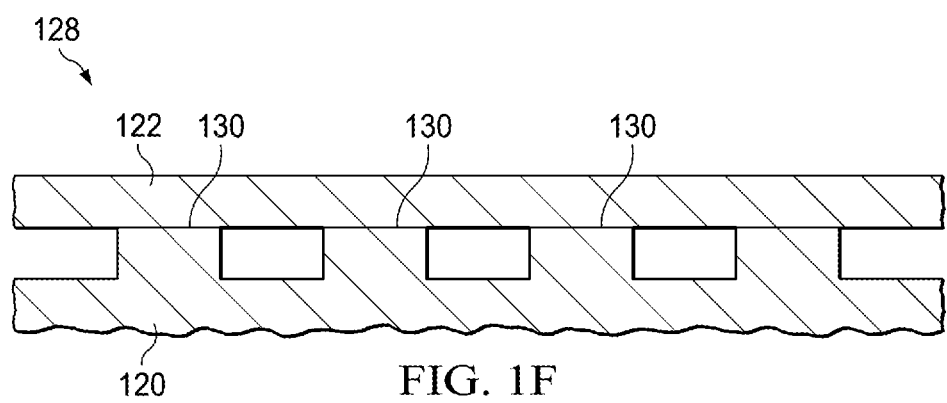

FIGS. 1A-1D are cross-sectional schematics that illustrate a method of preparing a surface for diffusion bonding, and FIGS. 1E and 1F illustrate diffusion bonding of the surface to a mating surface. The method is particularly advantageous for discontinuous surfaces 102, such as that shown in FIG. 1A, which include surface regions 104 separated by gaps or holes 106. The surface regions 104 may be coplanar, as illustrated. The discontinuous surface 102 is part of a first component 120 that may comprise a metal alloy, and the mating surface 124 (shown in FIG. 1E) is part of a second component 122 that may also comprise a metal alloy.

Surface preparation for diffusion bonding entails controllably applying a binder material 108 to the discontinuous surface 102. Prior to applying the binder material 108, the surface 104 may undergo standard cleaning and/or grinding procedures to remove contaminants such as dust, chemical residues, oxides or other compounds that could interfere with the bonding process. Referring now to FIG. 1B, a binder material 108 is contacted with the discontinuous surface 102 and is selectively deposited onto the surface regions 104. In other words, the binder material 108 may be deposited only on the surface regions 104. The binder material 108 has a sufficient viscosity to be deposited as a self-supporting layer 110 without flowing into the gaps 106. The contacting of the binder material 108 with the discontinuous surface 102 may entail rolling a belt or roller 112 (collectively referred to as "the roller 112") coated with the binder material 108 over the discontinuous surface 102, as illustrated. The compliance and surface roughness of the roller 112 may be selected to promote uniform and consistent deposition of the binder material 108, as discussed below. Advantageously, the self-supporting layer 110 of binder material 108 is controllably and uniformly deposited on the surface regions 104 with a mass density (mass per unit area) that may lie in a range from about 0.001 g/in$^2$ to about 0.050 g/in$^2$, with a preferred range of 0.002 g/in$^2$ to 0.010 g/in$^2$. The range and preferred range may depend upon the composition and viscosity of the binder material 108.

Referring now to FIG. 1C, a braze powder 114 is distributed over the self-supporting layer 110 of binder material 108. The braze powder 114 comprises a metal alloy which may be referred to as a braze alloy. The composition of the braze alloy may be selected based at least in part on the metal alloy(s) present at the discontinuous and mating surfaces 102,124, as discussed below. Distributing the braze powder 114 over the binder material 108 may entail dusting, scattering, or spraying the braze powder 114 over the self-supporting layer 110, such that some or all of the braze powder 114 attaches to the binder material 108. Because the binder material 108 is controllably and uniformly deposited on the surface regions 104, as described above, a predetermined amount of the braze powder 114 may be attached to the binder material 108, as illustrated in FIG. 1C. In other words, by controllably depositing the binder material 108 as described above in reference to FIG. 1B, the amount of braze powder 114 deposited on and ultimately adhered to the surface regions 104 (as described below in reference to FIG. 1D) may also be controlled. After deposition of the braze powder 114, it may be beneficial to remove any particles of the braze powder not attached to the self-supporting layer 110.

The discontinuous surface 102 is then heated in a vacuum or an inert gas atmosphere to remove the binder material 108 and adhere the braze powder 114 to the discontinuous surface 102, forming a braze deposit 116, as illustrated in FIG. 1D. The heating may comprise ramping to a sintering temperature and maintaining the sintering temperature for a sufficient time (e.g., at least about 30 minutes) to allow the braze powder 114 to sinter and bond to the surface regions 104. During the heating, typically during the ramp to the sintering temperature, the binder material 108 is pyrolyzed or vaporized, and thus removed from the discontinuous surface 102. Suitable temperatures for heating are high enough to remove the binder material 108 and to sinter the braze powder 114, but low enough to avoid melting of the braze powder 114 or reducing its activity as a melting point suppressant. Typically, the temperature is in a range from about 100° F. below the solidus to about 30° F. above the liquidus of the braze powder. The liquidus, or melting point, is the lowest temperature at which the braze powder is completely liquid, and the solidus is the highest temperature at which the braze powder is completely solid. In the case of braze powders comprising elemental metals, the temperature may depend on the type of reaction occurring; often these are eutectic formers where the solidus and liquidus are the same. Other elements with different variants of reaction are not out of the scope of this approach. In one example of a braze alloy used for bonding nickel-base alloy components, a suitable temperature range may be from about 1800° F. (982° C.) to about 1960° F. (1071° C.). As a consequence of heating, the braze powder 114 that was attached to the binder material 108 in the previous step (as shown in FIG. 1C) may be sintered and bonded to the discontinuous surface, as shown in FIG. 1D, such that the braze deposit 116 includes the predetermined amount of braze powder 114. Advantageously, this amount of braze powder is sufficient for diffusion bonding but is much less than the amount of braze material typically consumed when braze foil is used in conventional diffusion bonding. The predetermined amount of braze powder 114 adhered to the discontinuous surface 102 may lie in a range from about 0.04 g/in$^2$ to about 0.25 g/in$^2$, with a preferred range of about 0.06 g/in$^2$ to about 0.08 g/in$^2$.

After removal of the binder 108 and sintering/bonding of the braze powders 114 to form the braze deposit 116, the heating is halted, and the discontinuous surface 102 is cooled (e.g., to room temperature (18-25° C.)). The above-described surface preparation process to form the braze deposit 116 on the discontinuous surface 102 may be referred to as "prewetting," and the resulting surface may be referred to as a "prewet" surface 118.

Referring now to FIGS. 1E and 1F, the first component 120 comprising the prewet surface 118 may be assembled with a second component 122 comprising a mating surface 124, such that the prewet surface 118 contacts the mating surface 124 and an assembly 126 is formed. In one example, the prewet surface 118 may be part of a first component 120 comprising a metal alloy suitable for high temperature applications, such as a nickel-base alloy or a titanium-base alloy, and the mating surface 124 may be part of a second component 122 comprising a metal alloy suitable for high temperature applications, such as a nickel-base alloy or a titanium-base alloy. Typically, the first and second components 120,122 and the prewet and mating surfaces 118,124 comprise the same metal alloy. Upon exposure to a high temperature and a compressive force, preferably in a controlled environment, such as a vacuum or an inert gas atmosphere, the first and second components 120,122 may be diffusion bonded. Diffusion bonding may be carried out using methods known in the art. The temperature for diffusion bonding may depend upon the alloy and microstructure being bonded, but typically lies in a range from about 900° C. (~1650° F.) to about 1275° C. (~2325° F.).

Once metallurgically bonded together, as illustrated in FIG. 1F, the first component 120 and the second component 122 form a monolithic third component 128 comprising a homogeneous bonded interface 130 that may be substantially free of unwanted phases, defects, and/or porosity. The first and second components 120,122 may have a single-crystalline or polycrystalline (e.g., equiaxed) microstructure. In other words, the first component 120 may be single-crystalline or polycrystalline, and the second component 122 may be single-crystalline or polycrystalline. When both the first and second components 120,122 have a single-crystalline structure, a directionally solidified microstructure may be obtained across the bonded interface 130. The method is applicable to nickel-base alloys, iron-base alloys, and titanium-base alloys, such as titanium aluminides. The monolithic third component 128 may be utilized in a high temperature environment, such as a gas turbine engine. In one example, the monolithic third component 128 comprises an airfoil.

Figure 2:
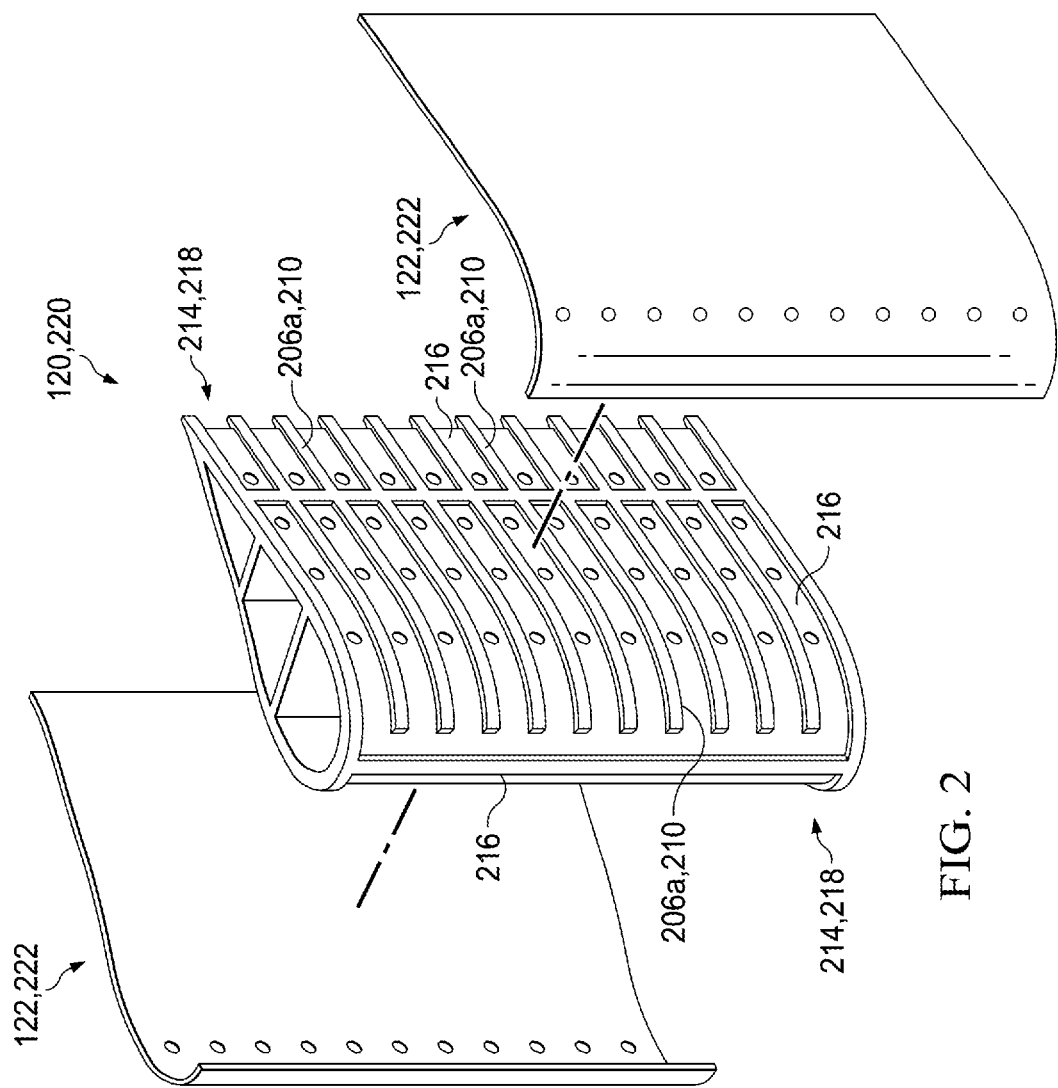
FIG. 2 shows an exemplary assembly for diffusion bonding comprising a spar and a cover sheet.

Referring now to FIG. 2, the first component 120 may be a spar 220 and the second component 122 may be a coversheet 222, which, when bonded together as described above, may form part or all of an airfoil with dual-wall cooling for use in a gas turbine engine. More specifically, the spar 220 may include a discontinuous surface 214 that undergoes the surface preparation process described above such that the braze powder 210 is adhered only to the surface regions 206a, forming a prewet surface 218. Referring to FIG. 2, the spar 220 may include raised surface features or "pedestals" having ends 206a that constitute the surface regions of the discontinuous surface 214, and flow channels 216 between the pedestals that constitute the gaps described above. The arrangement of the pedestals and flow channels 216 shown in FIG. 2 is provided as an example only and is not intended to be limiting. Besides airfoils (e.g., turbine blades or vanes), the above-described method may be applicable to the fabrication of combustion liners, heat shields, and/or other gas turbine engine components.

Advantageously, the binder material 108 has a viscosity in a range from about 50 centipoise (cP) to about 30,000 cP, with a preferred range of 1000 cP to 10,000 cP. Suitable binder materials 108 may comprise a polymer selected from the group consisting of cyanoacrylate polymers and acrylic polymers. Commercially available binder materials 108 may be employed. Prior to applying the binder material 108 to the discontinuous surface 102, a screening process may be carried out to select and/or ensure the suitability of the binder material 108. It should be noted that there were well over 35 different types of binders evaluated via a technical screening process and close to half of them were deemed acceptable. There are a large number of materials that could be utilized/screened as potential binders; preferred classes are mentioned here, but it is understood that this disclosure is not limited to these binders. Of those deemed acceptable, viscosity can be modified for each of them to particular applications.

The braze powder 114 may comprise a braze alloy suitable for elevated temperature usage. For example, nickel-based braze alloys may be employed for high temperature service applications (e.g., up to about 2100° F. or 1134° C.) and may be used for bonding nickel-base alloys, such as nickel-base superalloys utilized in gas turbine engines. Suitable nickel-based braze alloys may include additions of boron, chromium, aluminum, manganese, and/or silicon. In one example, the braze powder comprises nickel and boron. The braze powder may further comprise chromium and/or aluminum for oxidation resistance. Boron may be added in an amount from about 1.5-5 wt. %, and more typically 2-3 wt. %. Titanium-based braze alloys may also be employed for high temperature service applications and may be suitable for bonding titanium-base alloys, such as titanium aluminides. Suitable titanium-based braze alloys may include titanium alloyed with copper, nickel and/or zirconium.

Commercially available braze powder 114 may be employed. The braze powder may include particles of a spheroidal, spherical, polygonal, elongated, irregular, or other morphology. Typically, the braze powder includes particles in a sieve size range from −230 to +325 mesh, which is roughly equivalent to a particle size ranging from about 44 microns to about 63 microns. For some applications, it may be beneficial to repeat the contacting and depositing steps shown in FIGS. 1A-1C to form more than one self-supporting layer 110 of binder material 108 and braze powder 114. In such a case, it may be beneficial to employ braze powder 114 of different sieve size ranges for different layers of the binder material 108.

To achieve the desired mass density of the binder material 108 on the surface regions 104, the roller 112 may be selected to have a suitable modulus/compliance such that the binder material 108 is not deposited on edges or within the gaps 106. Along with the modulus/compliance of the roller 112, the roughness of the surface 102 and the roller 112 may also be important, along with binder type and viscosity, as discussed above.

Rolling may be carried out manually or rolling may be automated. Pressures applied to the roller 112 may be adjusted based on the contour of the surface 102 and the modulus/compliance of the roller 112 (as well as the width of the roller 112). Another variable that may affect deposition of the binder material 108 is the surface roughness of the roller 112. The modulus/compliance and surface roughness of the roller 112 may be balanced based on the contour and the surface condition of the substrate (component) such that there is proper control of the amount of binder material 108 laid down, while insuring that the binder material is not applied on adjacent surfaces where it is not desired. If the surface roughness is too high, excess binder material may accumulate in surface features of the roller, leading to localized excesses in binder material deposition or flow onto adjacent surfaces where the binder material is not desired. On the other hand, a roller having a highly smooth surface (i.e., a very low surface roughness) may exhibit a lack of wettability which results in lack of adequate binder material, leading to localized gaps in binder material deposition. Accordingly, the surface roughness of the roller 112 preferably lies in a range from about 16 rms to about 63 rms.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of preparing a surface for diffusion bonding that comprises contacting a binder material with a discontinuous surface comprising surface regions separated by gaps, where the binder material is selectively deposited onto the surface regions and has a sufficient viscosity to form a self-supporting layer without flowing into the gaps. The self-supporting layer of binder material comprises a mass density in a range from about 0.001 $g/in^2$ to about 0.050 $g/in^2$. A braze powder is distributed over the binder material, and a predetermined amount of the braze powder is attached to the binder material. The discontinuous surface is heated to remove the binder material and adhere the braze powder to the discontinuous surface, thereby forming a prewet surface with a braze deposit thereon.

A second aspect relates to the method of the first aspect, wherein the predetermined amount of braze powder lies in a range from about 0.04 $g/in^2$ to about 0.25 $g/in^2$, and wherein the braze deposit comprises the predetermined amount of braze powder.

A third aspect relates to the method of the first or second aspect, wherein contacting the binder material with the discontinuous surface comprises rolling a belt or roller coated with the binder material over the discontinuous surface.

A fourth aspect relates to the method of any preceding aspect, wherein the belt or roller comprises a surface roughness in a range from about 16 rms to about 63 rms.

A fifth aspect relates to the method of any preceding aspect, wherein the binder material comprises a polymer selected from the group consisting of cyanoacrylate polymers and acrylic polymers.

A sixth aspect relates to the method of any preceding aspect, wherein the viscosity of the binder material lies in a range from about 50 cP to about 30,000 cP.

A seventh aspect relates to the method of any preceding aspect, wherein the discontinuous surface is heated to a temperature at or above a sintering temperature of the braze powder and below a melting temperature of the braze powder.

An eighth aspect relates to the method of the seventh aspect, wherein the temperature is in a range from about 100° F. below a solidus to about 30° F. above a liquidus of the braze powder.

A ninth aspect relates to the method of any preceding aspect, wherein removing the binder material comprises pyrolyzing or vaporizing the binder material.

A tenth aspect relates to the method of any preceding aspect, wherein the heating is carried out in a vacuum or an inert gas atmosphere.

An eleventh aspect relates to the method of any preceding aspect, wherein the discontinuous surface is part of a first component comprising a metal alloy.

A twelfth aspect relates to the method of the eleventh aspect, wherein first component comprises a nickel-base alloy and the braze powder comprises nickel alloyed with boron and/or chromium.

A thirteenth aspect relates to the method of the eleventh or twelfth aspects, wherein the first component comprises a titanium-base alloy and the braze powder comprises titanium alloyed with copper, nickel, and/or zirconium.

A fourteenth aspect relates to the method of any preceding aspect, wherein the braze powder comprises particles having a sieve size range from about −230 to +325 mesh.

A fifteenth aspect relates to the method of any preceding aspect, wherein the braze powder comprises particles having a spheroidal, spherical, polygonal, elongated, or irregular morphology.

A sixteenth aspect relates to a method of diffusion bonding comprising: assembling a first component comprising the prewet surface of any preceding aspect with a second component comprising a mating surface to form an assembly, the braze deposit on the prewet surface contacting the mating surface; and exposing the assembly to a bonding temperature and a compressive force, thereby diffusion bonding the first component to the second component to form a monolithic third component comprising a bonded interface.

A seventeenth aspect relates to the method of the sixteenth aspect, wherein the monolithic third component comprises an airfoil, a combustion liner, a heat shield, or another gas turbine engine component.

An eighteenth aspect relates to the method of the sixteenth or seventeenth aspect, wherein the first component comprises a spar and the second component comprises a coversheet.

A nineteenth aspect relates to the method of any of the sixteenth through the eighteenth aspects, wherein the first and second components have a single-crystalline structure, and wherein a directionally solidified microstructure is obtained across the bonded interface.

A twentieth aspect relates to the method of any of the sixteenth through the nineteenth aspects, wherein the bonding temperature lies in a range from about 900° C. (~1650° F.) to about 1275° C. (~2325° F.).

In addition to the features mentioned in each of the independent aspects enumerated above, some examples may show, alone or in combination, the optional features mentioned in the dependent aspects and/or as disclosed in the description above and shown in the figures.

What is claimed is:

1. A method of preparing a surface for diffusion bonding, the method comprising:
   contacting a binder material with a discontinuous surface comprising surface regions separated by gaps, the binder material being selectively deposited onto the surface regions and forming a self-supporting layer without flowing into the gaps, the self-supporting layer of binder material being uniformly deposited on the surface regions with a mass density in a range from about 0.001 g/in$^2$ to about 0.050 g/in$^2$, wherein the contacting comprises rolling a belt or roller coated with the binder material over the discontinuous surface, an axis of rotation of the belt or roller being parallel to the surface regions;
   distributing a braze powder over the binder material, a predetermined amount of the braze powder being attached to the binder material; and
   heating the discontinuous surface to remove the binder material and adhere the braze powder to the discontinuous surface, thereby forming a prewet surface with a braze deposit thereon.

2. The method of claim 1, wherein the predetermined amount of braze powder lies in a range from about 0.04 g/in$^2$ to about 0.250 g/in$^2$, and wherein the braze deposit comprises the predetermined amount of braze powder.

3. The method of claim 1, wherein the belt or roller comprises a surface roughness in a range from about 16 rms to about 63 rms.

4. The method of claim 1, wherein the binder material comprises a polymer selected from the group consisting of cyanoacrylate polymers and acrylic polymers.

5. The method of claim 1, wherein binder material comprises a cyanoacrylate polymer or an acrylic polymer.

6. The method of claim 1, wherein the discontinuous surface is heated to a temperature at or above a sintering temperature of the braze powder and below a melting temperature of the braze powder.

7. The method of claim 6, wherein the temperature is in a range from about 100° F. below a solidus to about 30° F. above a liquidus of the braze powder.

8. The method of claim 1, wherein removing the binder material comprises pyrolyzing or vaporizing the binder material.

9. The method of claim 1, wherein the heating is carried out in a vacuum or an inert gas atmosphere.

10. The method of claim 1, wherein the discontinuous surface is part of a first component comprising a metal alloy.

11. The method of claim 10, wherein first component comprises a nickel-base alloy and the braze powder comprises nickel alloyed with boron and/or chromium.

12. The method of claim 10, wherein the first component comprises a titanium-base alloy and the braze powder comprises titanium alloyed with copper, nickel, and/or zirconium.

13. The method of claim 1, wherein the braze powder comprises particles having a particle size in a range from about 44 microns to 63 microns.

14. The method of claim 1, wherein the braze powder comprises particles having a spheroidal, spherical, polygonal, elongated, or irregular morphology.

15. A method of diffusion bonding comprising:
   assembling a first component comprising the prewet surface of claim 1 with a second component comprising a mating surface to form an assembly, the braze deposit on the prewet surface contacting the mating surface; and
   exposing the assembly to a bonding temperature and a compressive force, thereby diffusion bonding the first component to the second component to form a monolithic third component comprising a bonded interface.

16. The method of claim 15, wherein the monolithic third component comprises an airfoil, a combustion liner, a heat shield, or another gas turbine engine component.

17. The method of claim 15, wherein the first component comprises a spar and the second component comprises a coversheet.

18. The method of claim 15, wherein the first and second components have a single-crystalline structure, and wherein a directionally solidified microstructure is obtained across the bonded interface.

19. The method of claim 15, wherein the bonding temperature lies in a range from about 900° C. to about 1275° C.

* * * * *